(12) United States Patent
Shibata et al.

(10) Patent No.: US 7,412,601 B2
(45) Date of Patent: Aug. 12, 2008

(54) ILLEGAL DATA USE PREVENTION SYSTEM

(75) Inventors: Yoshiki Shibata, Chiba (JP); Kunio Sensui, Chiba (JP); Kazuhiro Yamamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 820 days.

(21) Appl. No.: 10/848,058

(22) Filed: May 19, 2004

(65) Prior Publication Data

US 2004/0250093 A1    Dec. 9, 2004

(30) Foreign Application Priority Data

May 22, 2003    (JP)    ............................. 2003-145247

(51) Int. Cl.
*H04L 9/00*    (2006.01)
(52) U.S. Cl. .................... 713/161; 713/160; 713/159
(58) Field of Classification Search ................. 713/161, 713/160, 150
See application file for complete search history.

(56) References Cited

U.S. PATENT DOCUMENTS

| 2002/0026424 A1 | 2/2002 | Akashi |
| 2002/0029347 A1 | 3/2002 | Edelman |
| 2003/0046568 A1 | 3/2003 | Riddick et al. |

FOREIGN PATENT DOCUMENTS

| EP | 1209657 A1 | 5/2002 |
| GB | 2370393 A | 6/2002 |
| JP | 2001-110137 | 4/2001 |
| WO | WO 01/41027 A1 | 6/2001 |
| WO | WO 01/84439 A1 | 11/2001 |

OTHER PUBLICATIONS

Login to Internet Websites by Next Generation Game Console Mohammad Shirali-Shahreza; Internet, 2006 2nd IEEE/IFIP International Conference in Central Asia on Sep. 2006 pp. 1-4.*
New multiparty authentication services and key agreement protocols Ateniese, G.; Steiner, M.; Tsudik, G.; Selected Areas in Communications, IEEE Journal on vol. 18, Issue 4, Apr. 2000 pp. 628-639.*
Secured net-banking by /spl theta/-Vigenere in Syverson's protocol Nacira, G.; Abdelaziz, A.; Computer Systems and Applications, 2005. The 3rd ACS/IEEE International Conference on 2005 p. 67.*
Fruru, T.; European Search Report; The Hague; Jul. 28, 2006.

* cited by examiner

Primary Examiner—David Jung
(74) Attorney, Agent, or Firm—Harness, Dickey & Pierce, PLC (57) ABSTRACT

An illegal data use prevention system includes a registrar which issues first authentication information for a game machine reproducing data and second authentication information for a user-identifying IC card. The data is identified by the first authentication information and the second authentication information. The game machine contains the first authentication information and, for example, executes a game program in accordance with a result of determination as to whether the IC card contains the second authentication information. Thus, illegal use of data is effectively prevented.

15 Claims, 4 Drawing Sheets

ILLEGAL DATA USE PREVENTION SYSTEM

This nonprovisional application claims priority under 35 U.S.C. § 119(a) on Patent Application No. 2003-145247 filed in Japan on May 22, 2003, the entire contents of which are hereby incorporated by reference.

FIELD OF THE INVENTION

The present invention relates to protection of copyrighted digital material, such as games and music.

BACKGROUND OF THE INVENTION

Conventionally, digital material, such as game software and music, is recorded on CD-ROMs (Read Only Memory), DVDs (Digital Video Disc), or other media. Its illegal use is prevented by, for example, encryption or copy protection. An associated method is disclosed in Japanese published unexamined patent application 2001-110137 (Tokukai 2001-110137; published on Apr. 20, 2001) disclosing discs and players capable of protection against illegal copying.

However, once a technological means is devised for decryption or copy protection overriding, such conventional illegal use prevention techniques for digital material can easily be circumvented for illegal use of the material with the technological means, which is an issue.

SUMMARY OF THE INVENTION

The present invention has an objective to offer an illegal data use prevention system capable of effective prevention of illegal data use.

To achieve the objective, an illegal data use prevention system in accordance with the present invention includes:

a data reproduction device reproducing the data; and authentication information issuing means issuing first authentication information for the reproduction device and second authentication information for a user-identifying user identification medium, the data being identified by the first authentication information and the second authentication information, wherein the data reproduction device includes: first authentication information storage means storing the first authentication information; and verification means determining whether the user identification medium contains the second authentication information, so as to reproduce the data in accordance with a result of the determination by the verification means.

According to the arrangement, the authentication information issuing means issues the first authentication information and the second authentication information, both used for data identification, for the data reproduction device and the user identification medium respectively. The verification means checks whether the data reproduction device and the user identification medium contain the first authentication information and the second authentication information respectively. The user identification medium may be an IC card, mobile phone, or other device which is given to a specific single user and enables the identification of that user.

The first authentication information and the second authentication information are issued to each set of data by the authentication information issuing means. Owing to this, the verification means determines whether the data reproduction device and the user identification medium are authentic with authentication information corresponding to that data set.

The data reproduction device reproduces the data in accordance with a result of the determination by the verification means: the device reproduces the data if the user identification medium is authentic and does not do so if the user identification medium is illegal due to missing second authentication information. "Data reproduction" here is intended to encompass not only the reproduction of music, computer programs, and other data, but also the execution of computer programs.

In this manner, the illegal data use prevention system in accordance with the present invention determines whether the user identification medium is authentic for the data reproduction. Therefore, the user has to present a user identification medium containing second authentication information obtained through an authentic route every time to reproduce the data. The user cannot reproduce data by means of an illegally obtained decryption or technological means overriding copy protection. Thus, the present invention offers an illegal data use prevention system capable of effective prevention of illegal data use.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

1. Overall Arrangement of System

An embodiment of an illegal data use prevention system of the present invention will be described in reference to FIG. 1 through FIG. 4.

Figure 1:
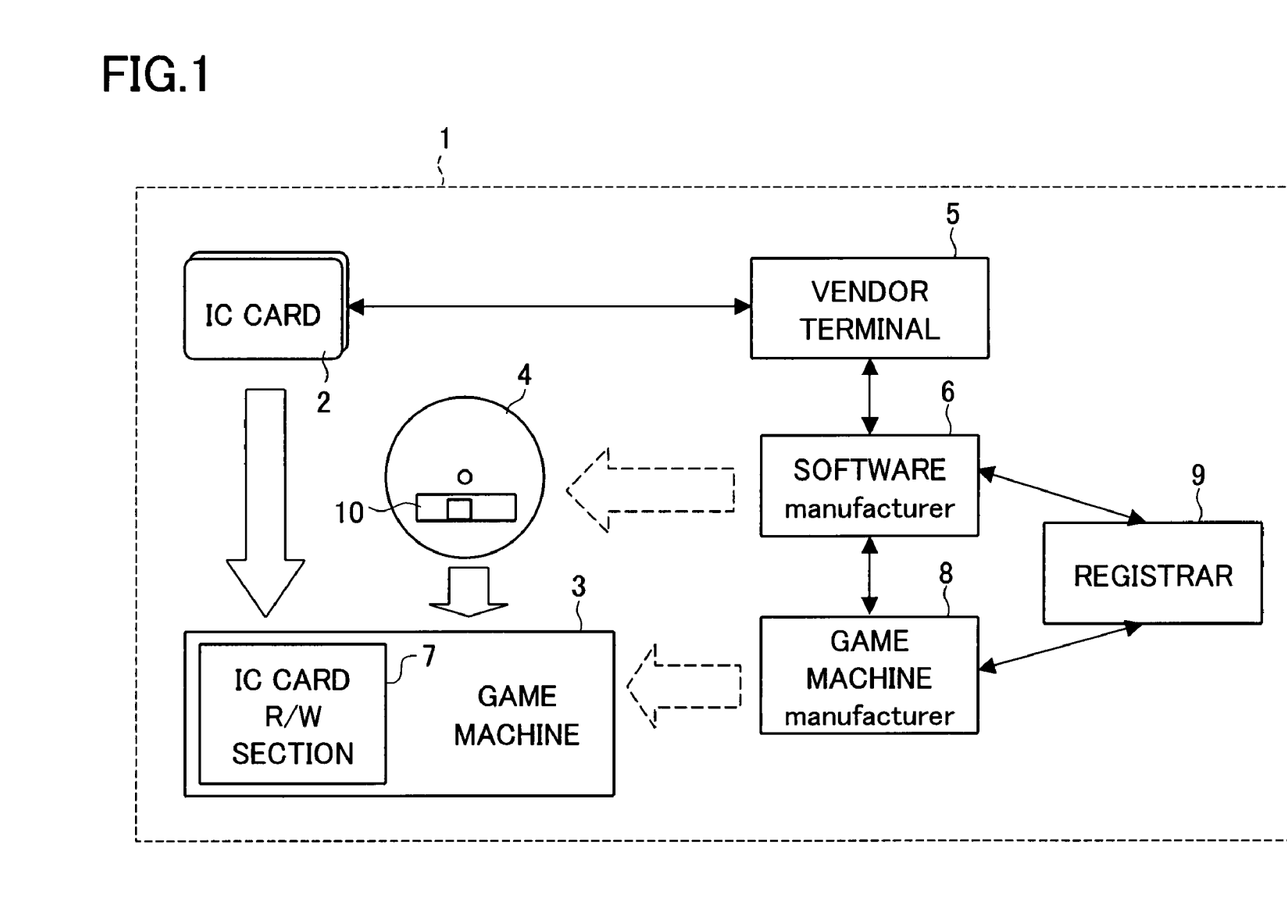
FIG. 1 is a block diagram illustrating an arrangement of an illegal data use prevention system in accordance with an embodiment of the present invention.

Referring to FIG. 1, an illegal data use prevention system 1 of the present embodiment is arranged from an IC card (user identification medium) 2, a game machine (data reproduction device) 3, a recording medium 4, a vendor terminal (authentication information issuing means, authentication information writing device) 5, and a registrar (authentication information issuing means) 9.

Read with the game machine 3, the IC card 2 is a medium containing use-right information for the digital content contained in the recording medium 4. "use-right information" refers to a decoding key and other decoding information required to decode the encrypted digital content contained in the recording medium 4. "Digital content" here is intended to encompass both computer programs, such as game software contained in the recording medium 4, and digital material, such as movies and music.

The IC card 2 is issued from the vendor terminal 5. The vendor terminal 5 is installed at a vendor's store selling recording media 4 in order to provide a means to transfer use-right information to be recorded in the IC card 2 and the ID information (data identification information) of the IC card as such to/from a game software manufacturer 6. The vendor terminal 5 obtains the aforementioned use-right information, etc. from the game software manufacturer 6 and records the obtained use-right information, etc. in the IC card 2 using PKI (Public Key Infrastructure) based on public key encryption.

The game machine 3 is a device executing computer programs, such as game software contained in the recording medium 4. The game machine 3 may also be configured to replay digital material, such as movies and music, contained in the recording medium 4. In the following, such execution of computer programs and reproduction of digital material may be collectively referred to as "reproduction of digital content."

The game machine 3 contains an IC card reader/writer section ("IC card R/W section") 7 which reads the use-right information contained in the IC card 2 and reads or writes other information contained in the IC card 2. The game machine 3 and the IC card R/W section 7 may be provided separately.

The game machine 3 is provided by the game machine manufacturer 8 connected to the registrar 9 over a communication line. The registrar 9 issues the game machine manufacturer 8 the first authentication information to determine whether the use-right information contained in the IC card 2 is authentic. The first authentication information is stored in the internal storage medium in the game machine 3 by the game machine manufacturer 8. The registrar 9 issues also for the game software manufacturer 6 second authentication information in association with the first authentication information assigned to the game machine manufacturer 8.

The game software manufacturer 6, game machine manufacturer 8, and registrar 9 may be provided by a single entity. The vendor terminal 5, game software manufacturer 6, game machine manufacturer 8, and registrar 9 are connected to one another via a communication line.

The vendor terminal 5 may be absent in some cases where game software is sold on the Internet. In those cases, the game software manufacturer 6 itself may issue an IC card 2 containing use-right information and mail or otherwise deliver the IC card 2 and recording medium 4 to the user. Alternatively, the IC card 2 and recording medium 4 may be handed to the user at a convenience or other store.

The game machine 3 determines whether the use-right information in the IC card 2 inserted inside is authentic on the basis of the first authentication information provided from the registrar 9 as mentioned earlier, so as to reproduce the digital content contained in the recording medium 4 on the basis of a result of the determination. The game machine 3 will be further detailed later in terms of arrangement and function.

The recording medium 4 may be a CD-ROM, DVD, etc., storing computer programs, such as game software, or digital material, such as music or movies as mentioned earlier.

The recording medium 4 includes an RFID (data identification medium) 10 containing an ID code identifying the digital content contained in the recording medium 4. The RFID 10 is preferably a contactless IC chip with a maximum communication range of 20 cm. The inclusion of the contactlessly readable RFID 10 allows the vendor terminal 5 to read the ID code without unpacking the recording medium 4 on the purchase of the recording medium 4.

The RFID 10 does not have to be directly attached onto the recording medium 4. Instead, the RFID 10 may be attached, for example, to a package containing the recording medium 4.

In the illegal data use prevention system 1 of the present embodiment thus arranged, the game machine 3 reads the use-right information of the IC card 2 and determines whether the use-right information is authentic based on the first authentication information stored in the game machine 3. If the use-right information is determined to be authentic, the game machine 3 enables reproduction of digital content from the recording medium 4. Now, the following will describe how use-right information is written to the IC card 2 at a vendor's store selling recording media.

First, the user brings a cashier a recording medium containing the digital content the user wants to buy. A person in charge of manipulation of the vendor terminal 5 ask the user for presentation of an IC card 2. If the user has no IC card 2, he needs to buy one following predetermined procedures. The subsequent description will assume that the user has already bought one.

The manipulator reads the ID code contained in the RFID 10 in the recording medium 4 using an RFID reader in the vendor terminal 5. The ID code of the digital content for which use-right information is needed is entered into the vendor terminal 5.

The manipulator then manipulates the vendor terminal 5 following on-screen instructions (not shown) from a use-right information obtaining program installed in the vendor terminal 5. Thus, a mutual verification takes place between the vendor terminal 5 and the manager of the use-right information, e.g. the game software manufacturer 6, so that it is determined from the ID code whether the user may be given use-right information.

On completion of the mutual verification, use-right information is transferred from the game software manufacturer 6 to the vendor terminal 5. At the same time, the game software manufacturer 6 transfers second authentication information issued by the registrar 9 to the vendor terminal 5 which then writes the second authentication information and use-right information to the IC card 2. Through the above procedures, the use-right information is written to the IC card 2.

2. Arrangement of Vendor Terminal

Figure 2:
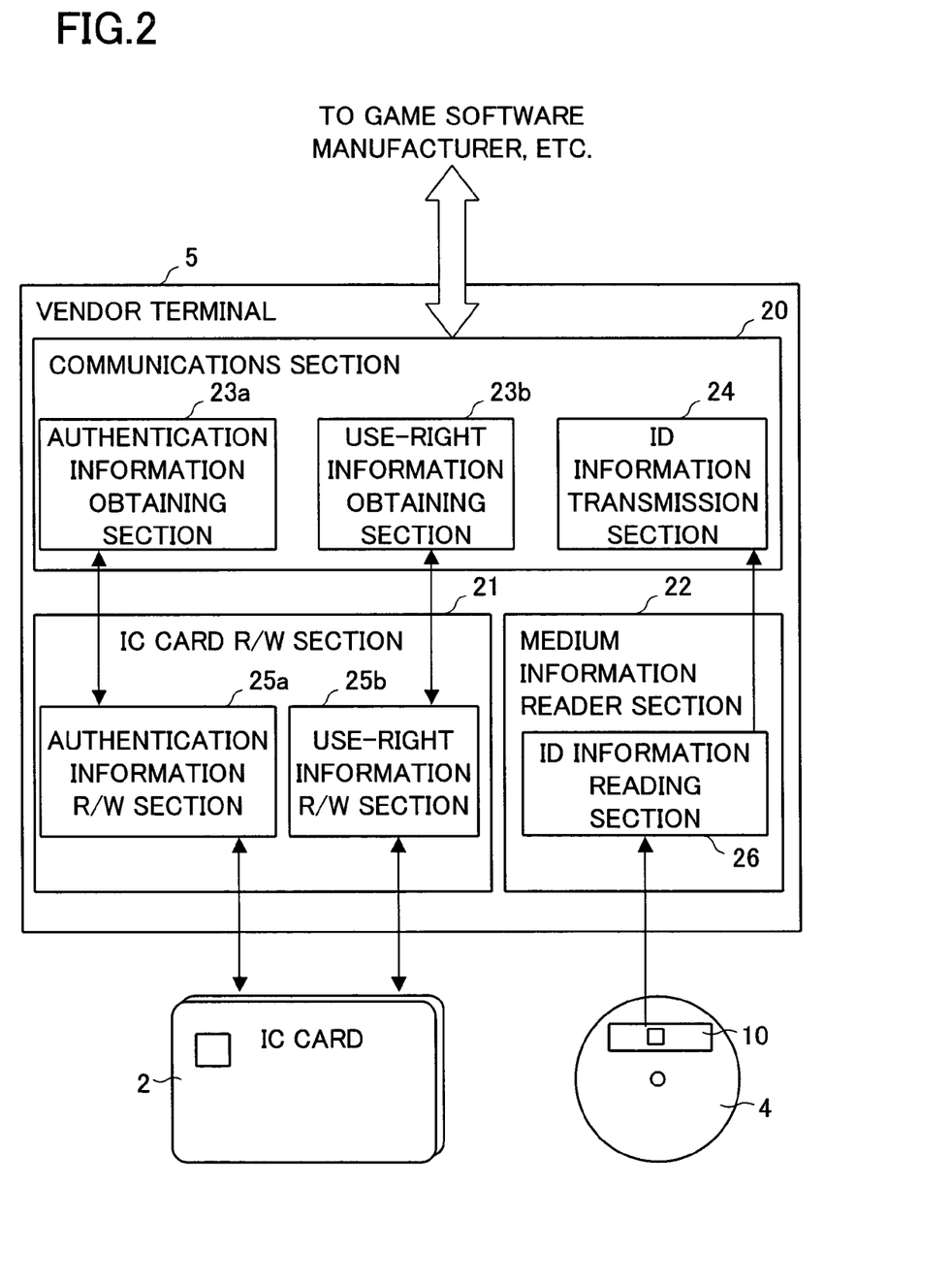
FIG. 2 is a block diagram illustrating an arrangement of the vendor terminal in FIG. 1.

Next, the arrangement of the vendor terminal 5 will be specifically described. Referring to FIG. 2, the vendor terminal 5 includes a communications section (communications means) 20, an IC card R/W section 21, and a medium information reader section 22.

To communicate with the game software manufacturer 6, the communications section 20 is equipped with an authentication information obtaining section 23a, a use-right information obtaining section 23b, and an ID information transmission section 24.

The authentication information obtaining section 23a obtains the second authentication information issued by the registrar 9 (FIG. 1) from the game software manufacturer 6. The use-right information obtaining section 23b obtains the use-right information from the game software manufacturer 6.

The ID information transmission section 24 transmits to the game software manufacturer 6 the ID code of the RFID 10 read by the ID information reading section (data identification information reading means) 26 in the medium information reader section 22 (detailed later).

The IC card R/W section 21 reads/writes various information from/to the IC card 2. The IC card R/W section 21 is equipped with an authentication information R/W section (writing means) 25a and a use-right information R/W section 25b.

The authentication information R/W section 25a writes the second authentication information obtained by the authentication information obtaining section 23a to the IC card 2. The use-right information R/W section 25b writes the use-right information obtained by the use-right information obtaining section 23b from the game software manufacturer 6 to the IC card 2.

The medium information reader section 22 includes the ID information reading section 26 to read various information from the RFID 10 attached to the recording medium 4. The ID information reading section 26 read the ID code from the RFID 10 and transmits it to the ID information transmission section 24 in the communications section 20. As mentioned earlier, the ID code is information by which the digital content from the recording medium 4 is identified.

The arrangement enables the vendor terminal 5 to read the ID code from the RFID 10 via the ID information reading section 26 and transmit the ID code readout from the ID information transmission section 24 to the game software manufacturer 6. Meanwhile, upon reception of the ID code from the ID information transmission section 24, the game software manufacturer 6 transmits the second authentication information and the use-right information corresponding to the ID code to the authentication information obtaining section 23a and the use-right information obtaining section 23b respectively. The authentication information R/W section 25a writes the second authentication information transmitted from the authentication information obtaining section 23a to the IC card 2. At the same time, the use-right information R/W section 25b writes the use-right information transmitted from the use-right information obtaining section 23b to the IC card 2. In this manner, the second authentication information and the use-right information are written to the IC card 2 by the vendor terminal 5.

3. Arrangement of Game Machine

Figure 3:
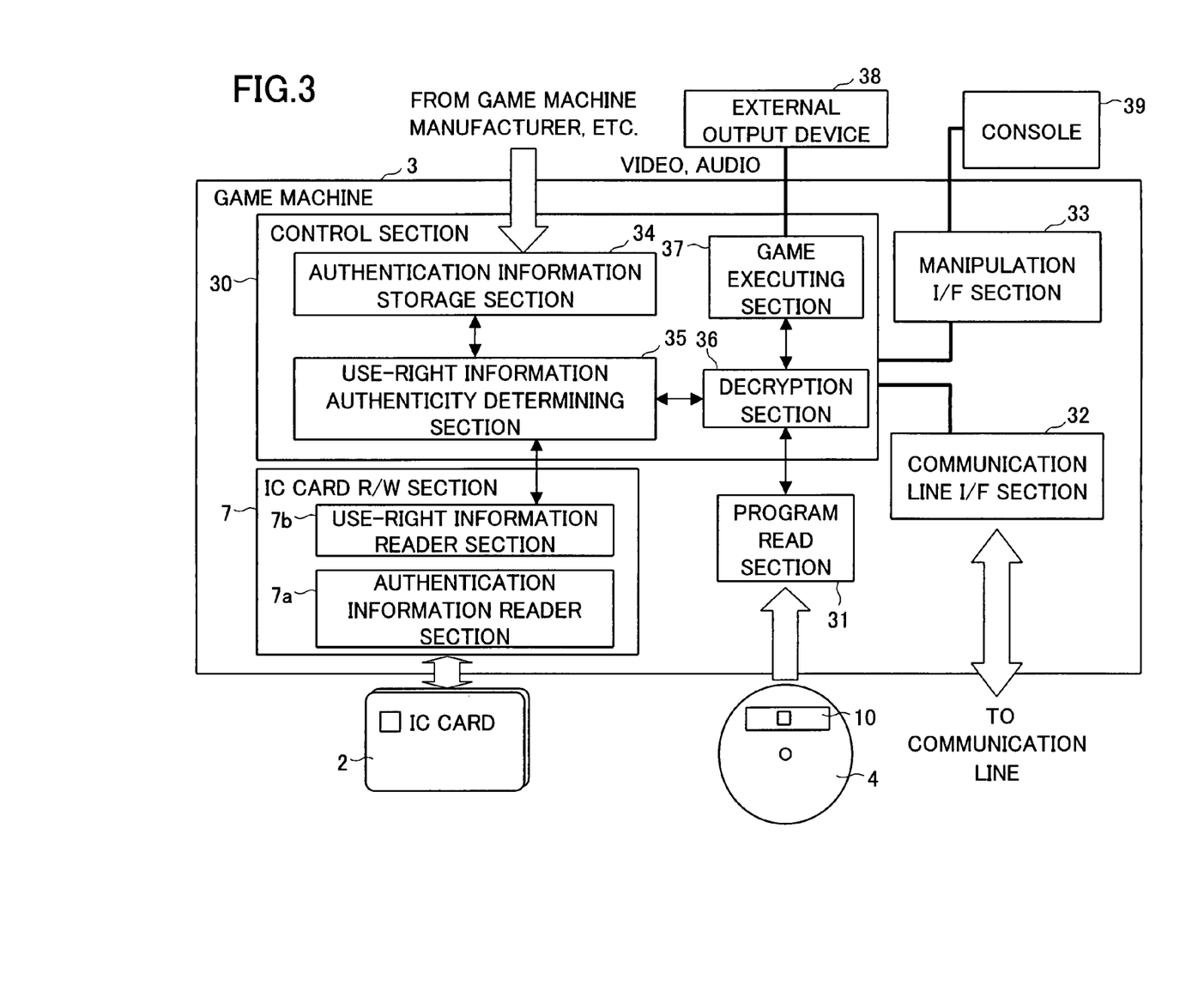
FIG. 3 is a block diagram illustrating an arrangement of the game machine in FIG. 1.

Next, the arrangement of the game machine 3 will be described. Referring to FIG. 3, the game machine 3 is equipped with a control section 30, a program read section 31, a communication line I/F section 32, and a manipulation I/F section 33. The game machine 3 includes an IC card R/W section 7 as shown in FIG. 1.

The control section 30 collectively controls reproduction operation of digital content by the game machine 3. Specifically, the control section 30 includes an authentication information storage section (first authentication information storage means) 34, a use-right information authenticity determining section (verification means, data reproducibility determining means) 35, a decryption section (decoding means) 36, and a game executing section 37.

The authentication information storage section 34 stores the first authentication information assigned from the game machine manufacturer in the manufacture of the game machine 3. The use-right information authenticity determining section 35 determines whether the use-right information read from the IC card 2 by the IC card R/W section 7 is authentic. Specific procedures will be detailed later.

If the use-right information authenticity determining section 35 determines that the use-right information contained in the IC card 2 is authentic, the decryption section 36 extracts a decoding key out of the use-right information in the IC card 2 and decodes the encrypted digital content from the recording medium 4 read by the program read section 31.

The game executing section 37 reproduces the digital content based on the digital content from the recording medium 4 decoded by the decryption section 36 and outputs resulting signals, audio, video, etc. to a TV monitor or other external output device 38.

The arrangement enables the control section 30 to determines whether the use-right information contained in the IC card 2 is authentic and reproduces the digital content contained in the recording medium 4 in accordance with a result of the determination.

The communication line I/F section 32 provides an interface between the control section 30 and external communication lines. The communication line I/F section 32 enables communications with the outside; the game machine 3 is thus enabled for online multilayer games and updating of the first authentication information stored in the authentication information storage section 34. The manipulation I/F section 33 provides an interface between the game machine 3 and a console 39 used by the user to manipulate the game machine 3.

The IC card R/W section 7 includes an authentication information reader section 7a reading the second authentication information from the IC card 2 and a use-right information reader section 7b reading the use-right information from the IC card 2. The use-right information read out by the use-right information reader section 7b is checked as to its authenticity by the use-right information authenticity determining section 35. The following will describe authenticity check procedures regarding the use-right information.

The use-right information is checked for its authenticity by the use-right information authenticity determining section 35 as mentioned above. Specifically, the use-right information authenticity determining section 35 determines whether the second authentication information read by the authentication information reader section 7a from the IC card 2 is related to the first authentication information stored in the authentication information storage section 34.

The first authentication information and the second authentication information are related to each other by the registrar 9 (FIG. 1) and issued as such by the game software manufacturer 6 and the game machine manufacturer 8. The game software manufacturer 6 then writes verification information to the IC card 2 through the vendor terminal 5 (FIG. 1). Meanwhile, the game machine manufacturer 8 stores the first authentication information to the authentication information storage section 34 in the manufacture of the game machine. So, provided that the user has an IC card 2 containing second authentication information and use-right information written by the authorized vendor terminal 5, the second authentication information in the IC card 2 is related to the first authentication information stored in the authentication information storage section 34 in the game machine 3.

Therefore, if the use-right information authenticity determining section 35 can find no relation between the authentication information, the section 35 determines that the use-right information in the IC card 2 is not authentic. In contrast, if the use-right information authenticity determining section 35 can find a relation between the authentication information, the section 35 determines that the use-right information in the IC card 2 is authentic.

If the use-right information authenticity determining section 35 confirms the authenticity of the use-right information in the IC card 2 by these procedures, the decryption section 36 obtains a decoding key from the IC card 2 to decode digital content from the recording medium 4. The game machine 3 is arranged in this manner so that it can reproduce digital content from the recording medium 4 if the use-right information in the IC card 2 is authentic.

In contrast, if the use-right information authenticity determining section 35 fails to determine the use-right information in the IC card 2 to be authentic, the decryption section 36 dose not obtain a decoding key from the IC card 2. Thus, the game machine 3 is arranged to prevent reproduction of the digital content when the IC card 2 is illegal.

4. Arrangement of IC Card

Figure 4:
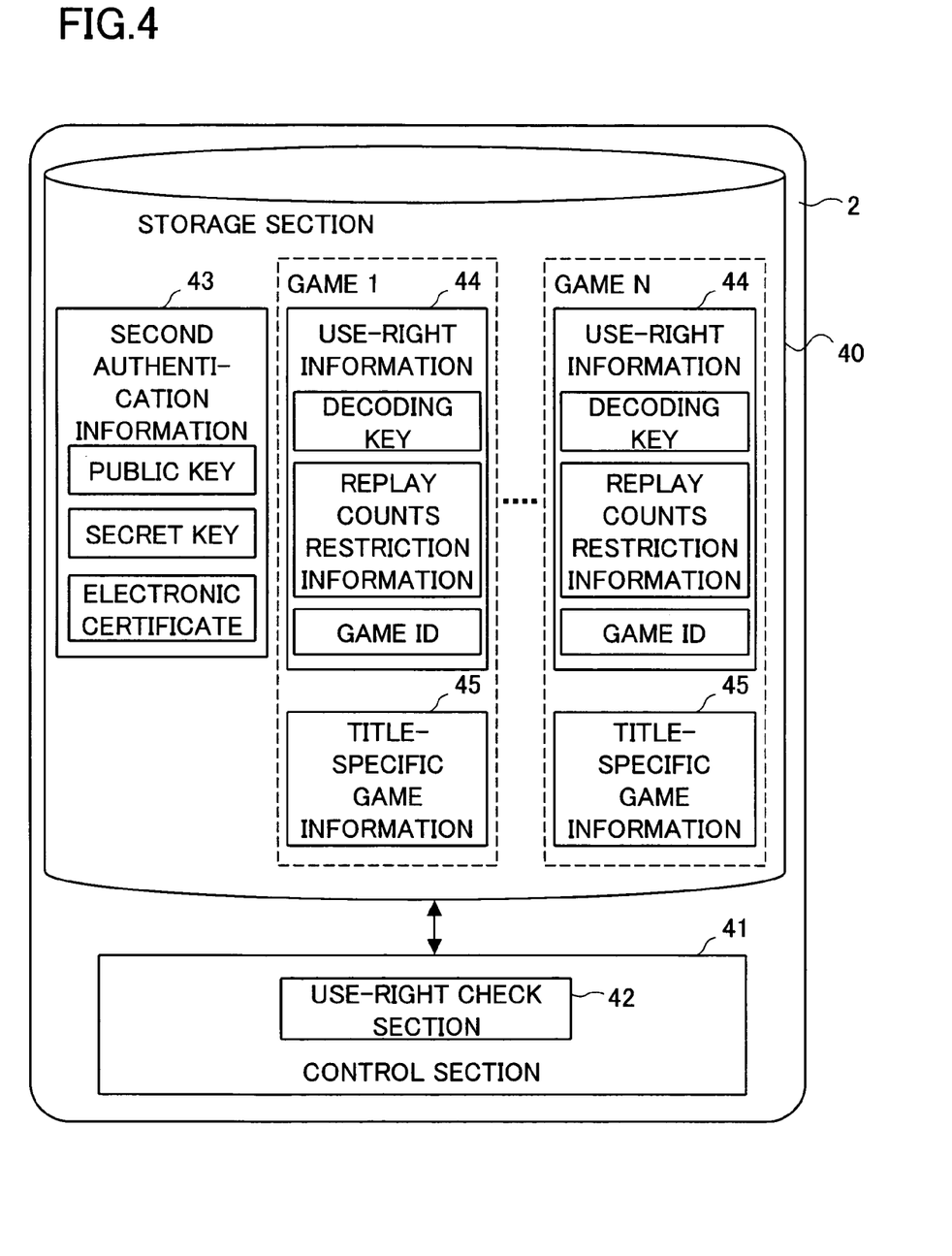
FIG. 4 is a block diagram illustrating an arrangement of the IC card in FIG. 1.

Next, an arrangement of the IC card 2 will be described. The IC card 2 includes a storage section 40 and a control section 41 as shown in FIG. 4.

The storage section 40 stores use-right information 44 and title-specific game information 45 for a set of games, as well as the second authentication information 43.

The second authentication information 43, as mentioned earlier, is information for use in authenticity check of use-right information. For example, if the second authentication information 43 is issued by the registrar 9 according to PKI, the information 43 includes a public key, a secret key, an electronic certificate, etc.

The use-right information 44 is information necessary to play a game and includes, for example, a decoding key and ID information for the game. As the use-right information 44 can be added replay counts restriction information indicating how many times the user has replayed the digital content of the recording medium 4. The provision of the use counts information enables reproduction of the content in relation to the number of times the content is reproduced: for example, a piece of content may be reproducible after the user reproduces another piece of the content ten times.

The title-specific game information 45 is information necessary to play the game continuously: e.g. the progress of the game, the status of game's leading characters, and the number of scores won.

The control section 41 collectively controls read/write operation of various information by an external device from/to the storage section 40. The control section 41 is equipped with a use-right check section 42.

When the authentication information reader section 7a and use-right information reader section 7b (see FIG. 3) reads the IC card 2, the use-right check section 42 controls the reading of the second authentication information and the use-right information from the IC card 2.

The arrangement enables the IC card 2 to store the second authentication information and the use-right information used in a reproduction of the digital content.

The blocks constituting the IC card 2, game machine 3, and vendor terminal 5 may be implemented by hardware logic or software. The latter is executed by a CPU as follows.

The IC card 2, game machine 3, and vendor terminal 5 are provided with a CPU (central processing unit) executing instructions of an illegal data use prevention programs realizing the functions of those members and memory devices (recording media), such as a ROM (read only memory) storing the programs, a RAM (random access memory) into which the programs are loaded, and memory storing the programs and various data. The present invention can achieve its objective also by providing a recording medium containing, in a computer-readable manner, the code (execution program, intermediate code program, or source program) of an illegal data use prevention program which is software realizing the aforementioned functions to the IC card 2, the game machine 3, or the vendor terminal 5 and its computer (or CPU, MPU) reading and executing the program code stored in the recording medium. When this is the case, the program code per se read from the recording medium realizes the aforementioned functions. The recording medium containing the code constitutes the present invention.

The recording medium may be, for example, a tape, such as a magnetic tape or a cassette tape; a magnetic disc, such as a floppy (registered trademark) disc or a hard disk, or an optical disc, such as CD-ROM/MO/MD/DVD/CD-R; a card, such as an IC card (memory card) or an optical card; or a semiconductor memory, such as mask ROM/EPROM/EEPROM/flash ROM.

Further, the system or device may be arranged to be connectable to a communications network so that the code can be downloaded from the communications network.

In addition, the functions described above are realized not only by the computer executing the code readout, but also by for example, an OS running on the computer partly or entirely performing the actual process according to the code instructions.

The illegal data use prevention system in accordance with the present invention may be arranged to write use-right information regarding, for example, a decoding right corresponding to digital material identification information to an IC card upon the purchase of digital material and execute or reproduce the digital material by a reproduction device for the digital material identifying the use-right information and the identification code of the digital material.

Further, in the foregoing arrangement, digital material content or either part or the entirety of supplemental recording information for the content may be encrypted by public key encryption, so that the encrypted digital material may be decoded using content-specific use-right information provided to the IC card.

Further, the use-right information may be obtained by downloading a secret key for content to the IC card after a mutual verification with a manager of the right information of the digital material using public key encryption from a terminal at a vendor's store via a communication line upon the purchase of the digital material.

Further, the use-right information may have additional use counts restriction information. The RFID or other recording medium containing the ID code assigned to the digital material may be a recording medium as such in which the digital material is written or may be attached in advance to a package case or box.

In the foregoing arrangement, for example, the use-right information of the IC card is verified first following a power-on of a reproduction device which is a game machine. Thus, if a medium, such as a CD-ROM or DVD, containing digital material is illegally copied, the digital material cannot be used so long as the IC card is not inserted into the reproduction device, because the medium itself has no use-right information.

Further, the use-right information is issued and written to the IC card after PKI-based secret key/public key encryption communications between the IC card and the manager of the use-right information; therefore, the use-right information cannot be copied or modified.

Further, upon the purchase of digital material, an RFID, etc. containing the ID code is attached in advance to the CD-ROM, DVD, or like medium itself or packaged case or box; thus, the terminal at a vendor's store can contactlessly read the ID code without unpacking. Therefore, necessary input operation for the ID code of digital material to obtain use-right information becomes simple and efficient.

Between the reproduction device and the IC card, a PKI-based verification that the inserted IC card is not illegal makes it impossible to use illegal IC cards, achieving effective protection of copyrighted digital material.

The IC card may contain use-right information for multiple pieces of digital material. This enables the user to use multiple pieces of digital material with a single IC card.

When this is the case, an electronic certificate may be used when purchase digital material is to be reproduced on a reproduction device.

The IC card has a memory function; therefore, in games, for example, the IC card can record current stage information, characters' scores, battle-waging capability information, etc. so that the player can restart the game where he left last time.

Adding use counts restriction information to use-right information enables sales of low-priced music data which can be reproduced only a limited number of times, e.g. twice.

As in the foregoing, an illegal data use prevention system in accordance with the present embodiment includes:

an authentication information issuing section (vendor terminal 5 or registrar 9) issuing first authentication information for a data reproduction device (game machine 3) reproducing data and second authentication information for a user-identifying user identification medium (IC card 2), the data being identified by the first authentication information and the second authentication information; and a verification section (use-right information authenticity determining section 35) determining whether the data reproduction device contains the first authentication information and whether the user identification medium contains the second authentication information, so that the data reproduction device reproduces the data in accordance with a result of the determination by the verification means.

According to the arrangement, the authentication information issuing section issues the first authentication information and the second authentication information, both used for data identification, for the data reproduction device and the user identification medium respectively. The verification section checks whether the data reproduction device and the user identification medium contain the first authentication information and the second authentication information respectively.

The first authentication information and the second authentication information are issued to each set of data by the authentication information issuing section. Owing to this, the verification section determines whether the data reproduction device and the user identification medium are authentic with authentication information corresponding to that data set.

The data reproduction device reproduces the data in accordance with a result of the determination by the verification section: the device reproduces the data if the user identification medium is authentic and does not do so if the user identification medium is illegal due to missing second authentication information.

in this manner, the instant illegal data use prevention system determines whether the user identification medium is authentic for the data reproduction. Therefore, the user has to present a user identification medium containing second authentication information obtained through an authentic route every time to reproduce the data. The user cannot reproduce data by means of an illegally obtained decryption or technological means overriding copy protection. Thus, the present invention offers an illegal data use prevention system capable of effective prevention of illegal data use.

Further, the instant illegal data use prevention system, in the above arrangement, is such that the data is encrypted;

the user identification medium stores decoding information based on which the data is decoded; and the data reproduction device includes decoding section (decryption section 36) obtaining the decoding information in accordance with the result of the determination by the verification section.

According to the arrangement, the user identification medium contains decoding information needed to reproduce data. In other words, the decoding information is not stored in every recording medium containing the data to be reproduced. Therefore, to reproduce encrypted data, the user has to present a user identification medium and enables the decoding means in the data reproduction device to obtain decoding information from the user identification medium.

Therefore, the instant arrangement provides an illegal data use prevention system capable of more effective prevention of illegal use of data.

Further, the instant illegal data use prevention system, in the above arrangement, is such that the authentication information issuing means issues the decoding information for the user identification medium by public key encryption.

According to the arrangement, the decoding information is issued for the user identification medium by public key encryption which boasts high level of security. Therefore, the decoding information used in decoding of encrypted data is security protected; thus, an illegal data use prevention system is provided capable of more effective prevention of illegal data use.

Further, the instant illegal data use prevention system, in the above arrangement, is such that the authentication information issuing section issues the second authentication information for the user identification medium by public key encryption.

According to the arrangement, the second authentication information is issued for the user identification medium by public key encryption which boasts high level of security. Therefore, the second authentication information is prevented from being issued for the user identification medium through an illegal route; thus, an illegal data use prevention system is provided with high level of security.

Further, the instant illegal data use prevention system, in the above arrangement, is such that the authentication information issuing section issues reproduction counts restriction information on the number of times the data can be reproduced for the user identification medium.

According to the arrangement, the data reproduction device refers to the reproduction counts restriction information issued for the user identification medium to restrict the reproduce counts of the data. Therefore, for example, a preview piece of music data, reproducible up to three times, may be provided to a user at a low price. Thus, the user can decide if he will actually buy music data after he tries it first. Data can be provided which better suits the need of users.

Further, the instant illegal data use prevention system, in the above arrangement, includes:

a data identification medium storing data-identifying data identification information; and data identification information reading section (ID information reading section 26) reading the data identification information, wherein the authentication information issuing section issues the second authentication information for the user identification medium in accordance with a result of the reading by the data identification information reading section of the data identification information.

According to the arrangement, if a data identification medium (RFID 10) is disposed, for example, on an recording medium containing the data to be reproduced or on a package of the recording medium, the data identification information reading section reads the data identification information contained in the data identification medium.

Further, the authentication information issuing section issues the second authentication information for the user identification medium in accordance with a result of the reading by the data identification information reading section. Therefore, if the data identification information is not stored in, for example, the data recording medium, the second authentication information is not issued. Thus, the second authentication information is issued for the user identification medium with a more secure scheme. Thus, an illegal data use prevention system is provided with improved security.

Further, the instant illegal data use prevention system, in the above arrangement, is such that the data identification medium is an RFID. The information stored in the RFID is contactlessly readable. Therefore, according to the arrangement, the RFID, or a data identification medium, disposed on the data-carrying recording medium or its package, allows the data identification information to be read without unpacking. The data identification information is easily read. A security-enhanced illegal data use prevention system is realized in a more simple form.

In addition, a data reproduction device in accordance with the present embodiment includes:

first authentication information storage section storing first authentication information, authentication information issuing section issuing the first authentication information and second authentication information by which data to be reproduced is identified;

verification section (use-right information authenticity determining section 35) determining whether a user-identifying user identification medium contains the second authentication information; and data reproducibility determining section (use-right information authenticity determining section 35) determining whether the data is to be reproduced in accordance with a result of the determination by the verification section.

In addition, a user identification medium in accordance with the present embodiment stores second authentication information, authentication information issuing section issuing first authentication information and the second authentication information by which data to be reproduced on a data reproduction device is identified, and the second authentication information is read by a verification section determining whether the data reproduction device contains the first authentication information to reproduce the data on the data reproduction device.

The data reproduction device arranged as above includes a verification section, hence capable of determining whether the user identification medium is authentic with the second authentication information. Further, the device includes a data reproducibility determining section determining data reproducibility in accordance with a result of the determination by the verification section, and if the user identification medium is authentic, can reproduce the data. In contrast, the data reproduction device may not reproduce the data if the user identification medium is determined to be illegal with no second authentication information.

In addition, the user identification medium arranged as above contains the second authentication information read to reproduce data on a data reproduction device.

Therefore, to reproduce data on the instant data reproduction device, the user has to present the user identification medium containing the second authentication information obtained through an authentic route. The user cannot reproduce data by means of an illegally obtained decryption or technological means overriding copy protection. Thus, the present embodiment offers a data reproduction device and a user identification medium capable of effective prevention of illegal data use.

In addition, an authentication information writing device in accordance with the present embodiment includes:

a communications section (20) receiving second authentication information, authentication information issuing section issuing first authentication information and the second authentication information by which data to be reproduced on a data reproduction device is identified; and writing section (authentication information R/W section 25a) writing the second authentication information received by the communications section to a user-identifying user identification medium which is readable to the data reproduction device capable of storing the first authentication information.

In the authentication information writing device arranged as above, the communications section receive the second authentication information issued by the authentication information issuing section over a network, and the writing section writes the second authentication information received to the user identification medium. In other words, multiple authentication information writing devices connected one authentication information issuing section can issue the second authentication information for user identification media. The second authentication information can be written to the user identification medium more easily.

Further, the instant authentication information writing device, in the above arrangement, further includes data identification information reading section reading data-identifying data identification information from a data identification medium storing the data identification information, wherein the communications section requests a transmission of the second authentication information from the authentication information issuing section in accordance with a result of the reading by the data identification information reading section.

According to the arrangement, if a data identification medium may be attached to, for example, a recording medium containing data to be reproduced or package of the recording medium, the data identification information reading section can read the data identification information from the data identification medium.

Further, the communications section requests a transmission of the second authentication information from the authentication information issuing section in accordance with a result of the reading by the data identification information reading section. Therefore, if, for example, the data recording medium contains no data identification information, the request is not made for a transmission of the second authentication information; the authentication information issuing section can thus transmit the second authentication information according to a more secure scheme.

In addition, an illegal data use prevention method in accordance with the present embodiment includes the steps of:

(a) an authentication information issuing section issuing first authentication information for a data reproduction device reproducing the data and second authentication information for a user-identifying user identification medium, the data being identified by the first authentication information and the second authentication information;

(b) a verification section determining whether the data reproduction device contains the first authentication information and whether the user identification medium contains the second authentication information; and (c) reproducing the data in accordance with a result of the determination in step (b).

The method results in similar operation and effects to the instant illegal data use prevention system.

In addition, an illegal data use prevention program in accordance with the present embodiment causes a computer to function as the authentication information issuing section and the verification section in the instant illegal data use prevention system. Loading the program to a computer system realizes the illegal data use system.

In addition, a computer-readable recording medium in accordance with the present embodiment contains the illegal data use prevention program. Loading the program from the recording medium to a computer system realizes the illegal data use prevention program.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An illegal data use prevention system preventing illegal use of data, comprising:
    a data reproduction device to reproduce the data; and
    authentication information issuing device to issue first authentication information for the reproduction device and second authentication information, related to the first authentication information, for a user-identifying user identification medium, the data being identified by the first authentication information and the second authentication information,
    wherein the data reproduction device includes: a first authentication information storage device to store the first authentication information; and verification device to determine whether the second authentication information stored in the user identification medium is related to the first authentication information, said data reproduction device being configured to reproduce the data if the verification device determines that the first authentication information and the second authentication information are related to each other.

2. The illegal data use prevention system as set forth in claim 1, wherein:
    the data is encrypted;
    the user identification medium is configured to store decoding information based on which the data is decoded; and
    the data reproduction device includes a decoding device to obtain the decoding information in accordance with the result of the determination by the verification device.

3. The illegal data use prevention system as set forth in claim 2, wherein the authentication information issuing device is configured to issue the decoding information for the user identification medium by public key encryption.

4. The illegal data use prevention system as set forth in claim 1, wherein the authentication information issuing device is configured to issue the second authentication information for the user identification medium by public key encryption.

5. The illegal data use prevention system as set forth in claim 1, wherein the authentication information issuing device is configured to issue reproduction counts restriction information on the number of times the data can be reproduced for the user identification medium.

6. The illegal data use prevention system as set forth in claim 1, further comprising:
    a data identification medium to store data-identifying data identification information; and
    a data identification information reading device to read the data identification information from the data identification medium,
    wherein the authentication information issuing device is configured to issue the second authentication information for the user identification medium in accordance with a result of the reading by the data identification information reading device of the data identification information.

7. The illegal data use prevention system as set forth in claim 6, wherein the data identification medium is an RFID.

8. A data reproduction device, comprising:
    a first authentication information storage device to store first authentication information, an authentication information issuing device to issue the first authentication information and second authentication information by which data to be reproduced is identified, the second authentication information being related to the first authentication information;
    a verification device to determine whether the second authentication information stored in a user-identifying user identification medium is related to the first authentication information; and
    a data reproducibility determining device to determine that data is to be reproduced if the verification device determines that the first authentication information and the second authentication information are related to each other.

9. The data reproduction device as set forth in claim 8, further comprising a communication device to provide an interface between the data reproduction device and external communications networks.

10. The data reproduction device as set forth in claim 8, further comprising a decoding device to obtain, in accordance with the result of the determination by the verification device, decoding information based on which the data encrypted and stored in the user identification medium is decoded.

11. A user identification medium, comprising:
    a storage section storing second authentication information, authentication information issuing device to issue first authentication information and the second authentication information by which data to be reproduced on a data reproduction device is identified; and
    a control section to control, when the data reproduction device reproduces the data, a read operation of the data reproduction device to determine whether the first authentication information stored in the data reproduction device is related to the second authentication information, the data being reproduced when the first authentication information is determined to be related to the second authentication information.

12. The user identification medium as set forth in claim 11, wherein the second authentication information contains a public key.

13. An authentication information writing device, comprising:
    a communications device to receive second authentication information, an information issuing device to issue first authentication information and the second authentication information by which data to be reproduced on a data reproduction device is identified; and
    a writing device to write the second authentication information received by the communications device to a user-identifying user identification medium which is readable to the data reproduction device capable of storing the first authentication information;
    a data identification information reading device to read data-identifying data identification information from a data identification medium storing the data identification information,
    wherein the communications means is configured to request a transmission of the second authentication information from the authentication information issuing device in accordance with a result of the reading by the data identification information reading device.

14. An illegal data use prevention method of preventing illegal use of data, comprising the steps of:
(a) issuing first authentication information for a data reproduction device reproducing the data and second authentication information, related to the first authentication information, for a user-identifying user identification medium, the data being identified by the first authentication information and the second authentication information;
(b) determining whether the data reproduction device contains the first authentication information and whether the user identification medium contains the second authentication information and, whether the second authentication information is related to the first authentication information; and
(c) reproducing the data if it is determined in step (b) that the first authentication information and the second authentication information are related to each other,
wherein the second authentication information for the user identification medium is issued in accordance with a result of reading data identification information, the data identification information being associated with the data.

15. A computer readable medium storing an illegal data use prevention program configured to cause a computer to execute the steps of:
(a) issuing first authentication information for a data reproduction device reproducing data and second authentication information, related to the first authentication information, for a user-identifying user identification medium, the data being identified by the first authentication information and the second authentication information; and
(b) determining whether the data reproduction device contains the first authentication information and whether the user identification medium contains the second authentication information and, whether the second authentication information is related to the first authentication information.

* * * * *